INVENTOR.
DANIEL ROSENTHAL
BY Albert M. Parker
ATTORNEY

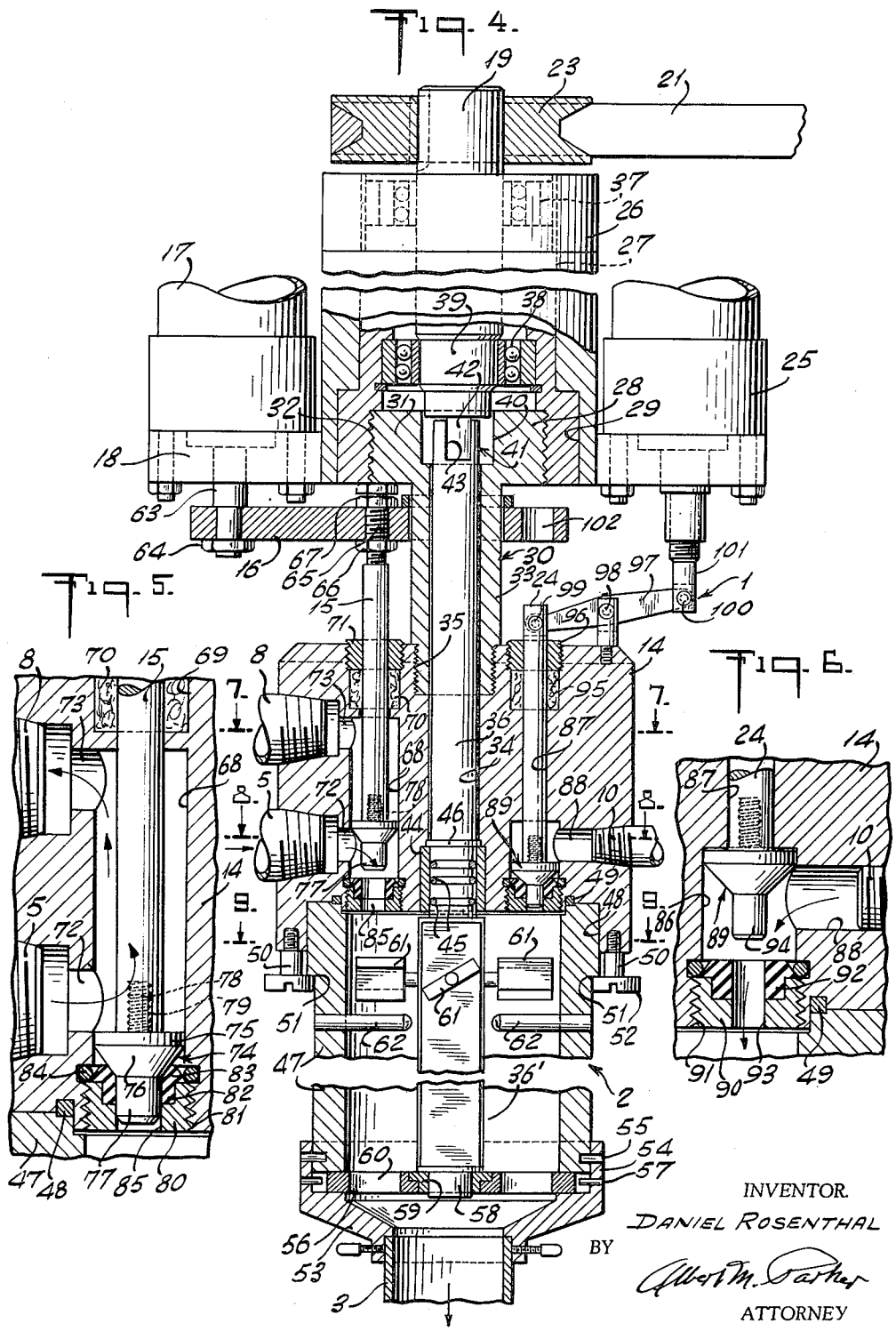

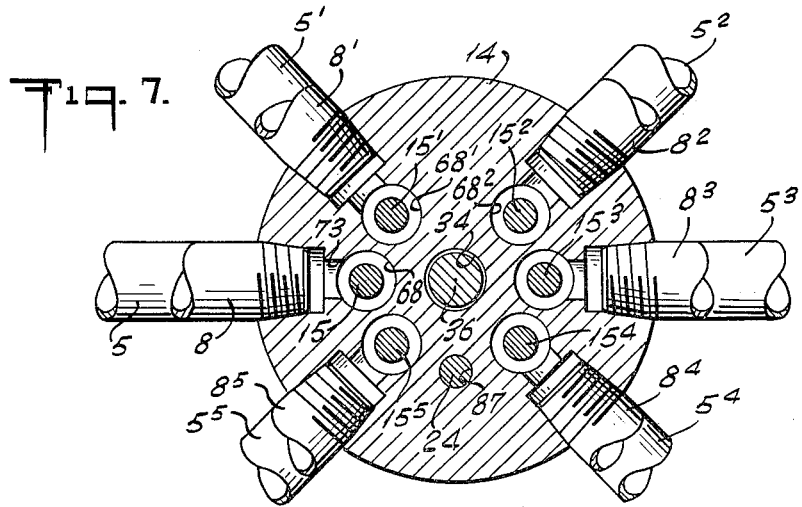

United States Patent Office 3,207,486
Patented Sept. 21, 1965

3,207,486
MIXING APPARATUS FOR QUICKLY REACTIVE COMPONENTS
Daniel Rosenthal, Brooklyn, N.Y. (% Gabriel Williams Co., Inc., 77 Mill Road, Freeport, N.Y.)
Filed Feb. 21, 1963, Ser. No. 260,334
8 Claims. (Cl. 259—8)

This invention relates to improvements in mixing apparatus, such apparatus being particularly adapted for mixing together a plurality of components which are quickly reactive. The apparatus of the described preferred embodiment includes means for cleaning and purging the mixing chamber of the apparatus whereby to preclude contamination of the subsequently mixed product.

The apparatus of the invention may be used to advantage for the mixing of various materials, such as resins, including the urethanes, epoxies, etc. An illustrative but non-limiting example of its usefulness is its use in the formation of polyurethanes. Polyurethanes are elastomeric materials resulting from the condensation polymerization of isocyanate and polyols. They derive their name from the chemical linkage formed when the isocyanate radical reacts with hydrogen. While polyurethanes is the name used most frequently to describe these compounds, they are referred to by some as polyester isocyanates, polyether isocyanates, or simply urethanes.

Depending on the nature of the isocyanate polyol reaction, the resulting product can take several forms: flexible foams, rigid foams, synthetic rubber, adhesives, coating, fibres, paints, and molding compounds. All come under the general heading of polyurethanes. As the research and exploration of the isocyanate polyol reaction have progressed, the mixing requirements have become increasingly complex and the ensuing formulations now number in the thousands. Where originally there were relatively simple combinations of two and sometimes three chemicals, many formulations now require the proper mixture of five, six and sometimes more components to produce a specific end product.

In making such formulations, the raw components of the formulations may not be permitted to combine before the actual mixing takes place. Such components are highly reactive, and in some cases the reaction between them may start in as little as three or four seconds. The problem of providing satisfactory apparatus for mixing components to form such products is a formidable one.

For example, the metering and mixing of the components must be accomplished on a linear basis because of their high degree of chemical reactivity. Because of this reactivity, the metered materials must be held separate and apart and must not be allowed to admix before entering the mixing chamber or cup. The formulation ratios must be controlled very closely and in the case of molded articles, it is of greatest importance that the ratios be held from the very moment of discharge to the moment of shut-off of the flow of the components into the mixing head. The mixing or metering head must also be so designed that it is small in size, simple in operation, and subject to automation. Most important, after the pumping pressures of the components have been balanced in and out of the mixing head, the discharge from the mixing head must be surge-free and of a constant, predetermined value. The ratio of the volumes of the components fed into the mixing chamber must be held precisely through each moment of time, even though the rates of such delivery of the components to the chamber are changed.

The invention has among its objects the provision of novel mixing apparatus adapted for the mixing of two or more components.

A further object of the invention resides in the provision of mixing apparatus for thoroughly mixing and homogenizing quickly reactive components.

Another object of the invention resides in the provision of mixing apparatus which is characterized by the accuracy of metering and delivering the respective components to be mixed to the mixing chamber.

Still another object of the invention resides in the provision of novel mixing apparatus wherein surges occasioned by the starting and stopping of flow of components to the mixing chamber are substantially eliminated so that the metering of such components may be very accurately accomplished.

Yet another object of the invention lies in the provision of mixing apparatus of the type indicated, wherein flow-determining parts including delivery orifice-forming and valving elements leading to the mixing chamber are easily replaceable, whereby predetermined different delivery rates of the respective components may be separately selected.

A further object of the invention resides in the provision of a mixing apparatus which readily lends itself to either manual or automatic control.

A still further object of the invention resides in the provision, in mixing apparatus of the type indicated, of means for quickly and easily cleaning and purging the mixing apparatus.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in elevation of a mixing apparatus in accordance with the invention, the view showing a source of supply of one of the components such as resins to be mixed by the apparatus and a source of supply of a cleaning solvent for purging the apparatus following a mixing operation, the source of supply of and the means for delivering to the mixing chamber the one resin and the cleaning solvent being shown somewhat schematically.

Figure 1:
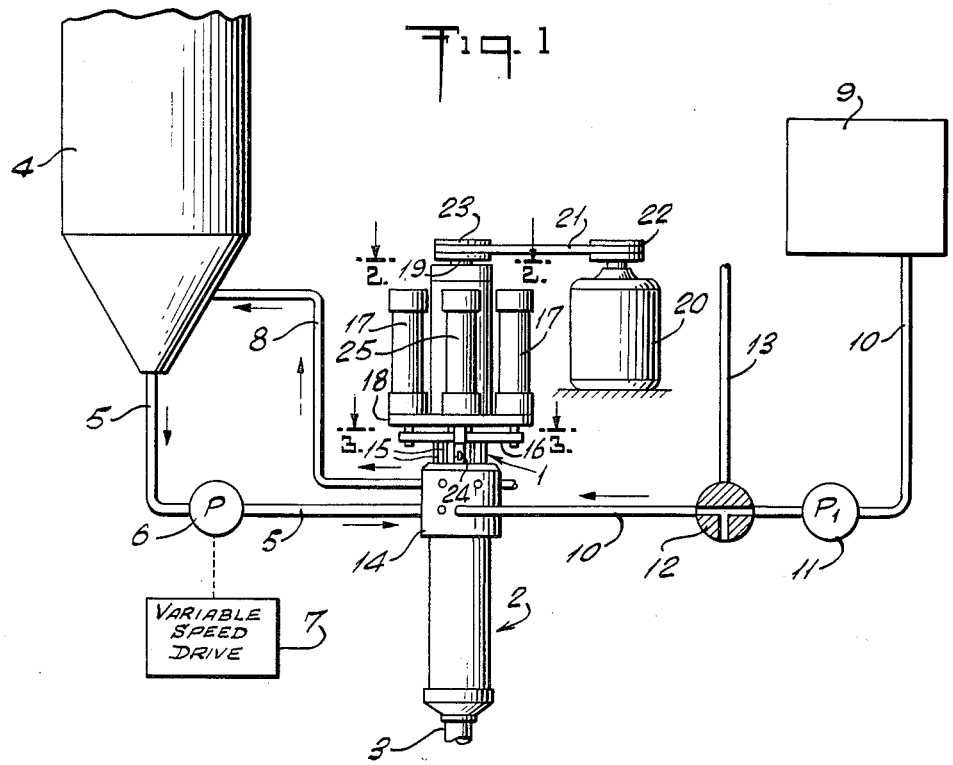
Figure 2:
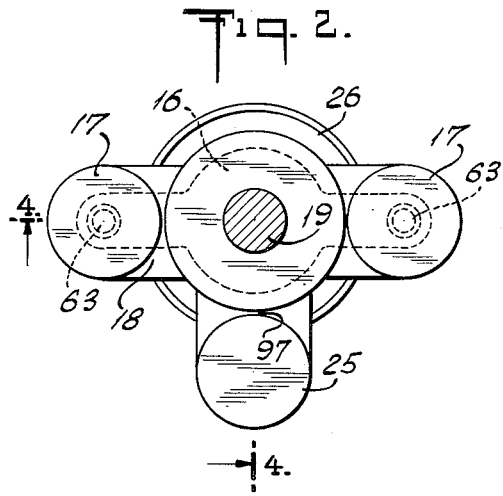
FIG. 2 is a view in horizontal section through the upper part of the mixing head of the apparatus, the section being taken along the line 2—2 in FIG. 1 and the view being that in the direction of the arrows.
Figure 3:
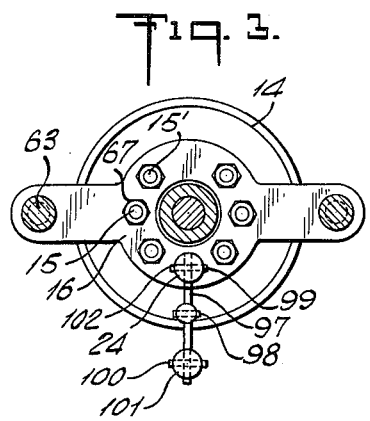
FIG. 3 is a view in horizontal section through an intermediate part of the mixing head of the apparatus, the section being taken along the line 3—3 in FIG. 1 and the view being that in the direction of the arrows.

FIG. 4 is a view in vertical section on an enlarged scale through the mixing head shown in FIGS. 1, 2, and 3, the section being taken along the right-angled line 4—4 of FIG. 2 and the view being that in the direction of the arrows, the portions of FIG. 4 to the left and right of the vertical center line thereof being taken along lines which, in FIG. 2, are horizontal and vertical, respectively, certain of the parts being shown in elevation, the component injecting valve being shown open and the solvent-injecting valve being shown closed.

FIG. 5 is a fragmentary view in vertical section on a somewhat enlarged scale of the valve of the component-injecting device which is shown at the left in FIG. 4, such valve being shown closed, certain of the parts being shown in elevation.

FIG. 6 is a fragmentary view in vertical section on a somewhat enlarged scale of the apparatus of FIG. 4, such figure showing the valve of the cleaning solvent injector mechanism in open position, certain of the parts being shown in elevation.

FIG. 7 is a view in horizontal section through the valve assembly of the mixing apparatus in the vicinity of the upper ports of the component injecting valves, the section being taken along the line 7—7 of FIG. 4 and the view being that in the direction of the arrows, certain of the parts being shown in plan.

FIG. 8 is a view in horizontal section through the valve assembly of the mixing apparatus, the section being taken along the line 8—8 of FIG. 4 and the view being that in the direction of the arrows, certain of the parts being shown in plan, and FIG. 9 is a view in horizontal section through the upper end of the mixing chamber of the apparatus, the section being taken along the line 9—9 of FIG. 4 and the view being that in the direction of the arrows, certain of the parts being shown in plan.

The mixing apparatus of the present invention, which is designated generally by the reference character 1, includes a mixing chamber or cup, generally designated 2, chamber 2 having a discharge conduit 3 at the bottom end thereof through which the mixture is discharged to a location such as a cavity to be filled, a traveling belt, etc. In the embodiment shown, the mixing apparatus is adapted for mixing a maximum of six components and thus includes six identical injecting valves of which one is shown in detail in FIGS. 4, 5, and 6. For simplicity, in FIG. 1 a single kettle or tank 4 for supplying one of such injecting valves with a component is shown. Such kettle 4 feeds its component, such as a resin, through a conduit 5 to a positive displacement pump 6 which is driven at variable speed by a variable speed drive generally designated 7. Beyond pump 6 conduit 5 is connected to the lower port 72 (FIG. 5) of the respective resin-injecting valve, to be described in detail hereinafter. The six resin-injecting valves are identical; each such injecting valve has a bore, designated 68 in the one such valve shown in FIGS. 4 and 5. Bore 68 forms a part of the path of continuous flow of the resin forwarded thereto by pump 6, the resin flowing upwardly through bore 68, when the injecting valve is closed, outwardly through the upper port 73 (FIG. 5) and back to resin kettle 4 through a return conduit 8.

The mixing apparatus 1 is also provided with means whereby the mixing apparatus may be cleaned and purged between successive mixing operations. In FIG. 1 there is schematically shown a tank 9 for a supply of solvent which may be selectively introduced into the mixing cup or chamber 2 of the apparatus through a discharge conduit 10 which leads to a pump 11, the pump when driven delivering the solvent through a manually operated two-position valve 12 to the single solvent-injecting valve shown at the right in FIG. 4. When such valve is open, as shown in FIG. 6, solvent is discharged therethrough into the mixing chamber. Also connected to valve 12 is a conduit 13 leading to a suitable source (not shown) of compressed gas such as compressed air. Preferably, after a predetermined quantity of solvent has been introduced into the mixing cup 2 from tank 10 in a manner described, pump 11 is stopped, and valve 12 is turned through 90° so that compressed gas from pipe 13 is then introduced to the solvent-injecting valve and thence to the interior of the mixing cup 2, whereby to blow the remaining solvent out of the cup and to dry the surfaces of the cup and the impeller therein, so that the cup is then ready for mixing a further batch of resins. The opening and closing of the component injecting valves may be controlled either manually or automatically by mechanism not shown. The control of the injection of solvent into the mixing chamber, and the subsequent admission of gas under pressure into the mixing chamber may also be controlled by manual or automatic means, not shown.

Turning now to FIGS. 2–9, inclusive, and particularly to FIG. 4, the mixing apparatus there shown has a valve assembly having a body 14 which forms an upper end closure for the mixing cup 2, the body 14 having six vertical bores 68, $68^1$, $68^2$, etc., disposed therein, such bores being angularly spaced about the axis of body 14 in the manner shown in FIGS. 3, 7, and 8. Parts of the six component injecting valves, which are the same from valve to valve, are designated by the same reference character but with the addition of an appropriate superscript except in the case of the valve shown in FIGS. 4 and 5. When the construction of the component valves is described hereinafter, parts of such valves will be referred to without superscripts. Disposed coaxially within such bores, of which the one designated 68 is shown at the left in FIG. 4, are the respective movable valve elements of the injection valves, each of such elements, which are similar, having a central valve rod 15 which is connected at its upper end to a horizontal valve element actuating plate 16 (FIGS. 1 and 3). The plate 16 is selectively raised and lowered, so as to open and close the component injector valves, by two vertical oppositely disposed air cylinders 17. The casings of such air cylinders are connected to a supporting plate 18, as shown in FIGS. 1 and 4. The piston rods 63 of such air cylinders are connected at their shouldered lower ends by nuts 64 to the opposite end portions of oppositely directed wings on plate 16.

The mixing apparatus also includes means whereby upon the injection of components into the mixing cup 2 they are immediately mixed so that they are discharged therefrom in homogeneous mixed condition. Such mixing means includes an upper stub shaft 19 which is centrally mounted for rotation in a housing 26 which is connected to the upper end of the valve assembly body 14 of the apparatus. Stub shaft 19 is continuously driven, when components are being mixed, by a motor 20 (FIG. 1) through the medium of a V belt 21 which is entrained over a pulley 22 on the drive shaft of the motor and a pulley 23 keyed to the upper end of the stub shaft 19.

The purging mechanism includes a selectively openable valve in body 14, such purging valve being disposed nearest the reader in FIG. 1, at the bottom in FIG. 3, and at the right in FIG. 4. The purging valve includes a valve rod 24 which is movable vertically between valve closed and valve open position by a vertically disposed air cylinder 25 which is located between air cylinders 17, as shown in FIGS. 1 and 2. When the apparatus is engaged in a mixing operation, the purging valve is held in closed position by energizing cylinder 25 so that the piston thereof is impelled upwardly. When a mixing operation has been completed and it is desired to clean the mixing compartment, solvent is introduced under pressure to the purging valve, as above described. The purging valve is then opened to introduce solvent into the mixing chamber. Preferably during such purging operation the mixing impeller is rotated by motor 20 so as thoroughly to agitate the solvent. Following the introduction of compressed gas into the chamber, as above described, the apparatus is again ready for a mixing operation. It will be understood that, with the described apparatus, anywhere from two to six components may be mixed. This may readily be accomplished by placing components in the particular tanks or kettles 4 which supply the injector valves to be employed, the other kettles being left empty. It is, of course, to be understood that the apparatus may be made with any feasible number of component-injecting valves and sources of supply therefor.

The structure of mixing apparatus 1 is shown in detail in FIGS. 4–9, inclusive. As shown in FIG. 4, disposed within upper housing 26 and retained therein as by being pressed thereinto is a sleeve-like lining member 27, which functions to mount upper and lower bearings 37 and 38 for the stub shaft 19. The lower end of sleeve member 27 is enlarged at 28 and accurately fits within a counterbore 29 in the lower end of housing 26. An adapter sleeve member, generally designated 30, has an enlarged upper end or head 31 which has threaded engagement at 32 with the bore of the enlarged portion 28 of sleeve member 27. Member 30 has a central sleeve portion 33, the lower end of portion 33 being threadedly received in a central counterbore 35 at the upper end of valve assembly body 14.

Rotatably mounted in the central bore in sleeve member 33 and in a central bore 34 in valve assembly body 14 is an agitator spindle 36 which is drivingly connected to stub shaft 19 (FIG. 4) through an articulated driving connection 41. The lower end of stub shaft 19 is in the form of a blade-shaped central tang 42 which is disposed within a counterbore 40 in the upper enlarged head 31 of member 30. The driving connection 41 includes the tang 42 and the clevis or slotted formation 43 on the upper end of shaft 36. Such driving connection permits the assembly, including the upper housing member 26, to be readily removed from the valve assembly body 14 and the mixing chamber 2 connected thereto. Disposed in a counterbore at the lower end of the central bore 34 in body 14 is a sleeve 44 which cooperates with a zone of shaft 36 bearing a plurality of annular grooves (three shown) in which are disposed sealing O-rings 45. A spring ring 46, snapped into an annular groove in shaft 36, engages the upper end of sleeve 44 so as to locate the shaft 36 accurately against downward movement.

The mixing cup or chamber 2 has a cylindrical tubular casing 47, the upper end of which is snugly received within a counterbore 48 at the bottom end of body 14. A sealing ring 49 disposed within an annular groove in the bottom wall of the counterbore 48 insures sealing between housing 14 and housing 47 when the parts are assembled as shown in FIG. 4. Housing 47 is retained in the position shown by a plurality of angularly spaced vertically disposed retaining screws 50 which are screwed into the bottom end of the body 14 at locations outwardly of the counterbore 48 therein. Screws 50 have enlarged flanged heads 52 which are of such diameter as to overlie an annular shoulder 51 adjacent the upper end of the housing 47. When tightened, the screws 50 retain the upper end of housing 47 in forcible sealing engagement with the sealing ring 49. When, however, it is desired to remove casing 47 from body 14, as during the replacement of one or more of the valve seat-forming members of the component-injecting valves, and/or the movable valve elements cooperating therewith, it is necessary only to remove screws 50, whereby the casing 47 may be withdrawn axially from body 14 when portion of shaft 36 there designated 36' has the angular relationship with respect to casing 47 shown in FIG. 9.

Secured to the bottom end of casing 47 is a generally frusto-conical adapter fitting 53. The upper larger head portion 54 of the adapter fitting is telescoped over the lower end of casing 47 and is retained thereon by means of a plurality of pins 55 which project inwardly through the upper end of the fitting and into blind openings in housing 47. Positioned beneath the lower end of casing 47 and spanning the distance between the opposite walls of the upper end of the adapter 53 is a plate or spider 56 which is supported on a horizontal shoulder interiorly of the adapter. The spider is held accurately in place and retained from rotation by a plurality of pins 57 projecting radially inwardly through portion 54 of the adapter, the inner ends of such pins being received in slots in the outer edge of the spider. The lower end of agitator shaft 36 has a central pilot pin 58 thereon, such pin being journalled in a central bearing 59 mounted in the spider. A plurality of openings 60 through the spider provide free communication between the interior of the mixing chamber and the upper end of discharge pipe 3 which is connected to the lower smaller end of the adapter fitting 53, as shown.

The portion of the agitator shaft 36 which lies within the mixing chamber 2 is designated 36'. As shown in FIG. 9, portion 36' of such shaft is generally square in cross section, the corners of the shaft being rounded. Mounted upon the flat sides of portion 36' of the shaft 36 are a plurality of inclined mixing paddles or agitator blades 61, there being one blade on each of the four sides of the shaft and there being a plurality of sets (one shown) of four paddles disposed on the shaft and spaced vertically therealong. The paddles 61 are preferably so inclined, as shown in FIG. 4, that as shaft 36' rotates, the paddles force the mixture of components downwardly toward the discharge conduit 3. Closely associated with each set of mixing paddles 61 is a set of fixed mixing members which, in the embodiment shown, are pins 62 which extend radially inwardly from the housing 47 to positions close to the shaft 36'. Paddles 61 and pins 62 cooperate to cause the components to become thoroughly mixed in their travel downwardly through the chamber toward conduit 3. Preferably, the paddles and pins in each set thereof are disposed in the same manner as those shown in FIG. 9, to permit the ready removal, when desired, of the casing 47 from the body 14 of the valve assembly, as above described.

As shown most clearly in FIG. 4, the cylinders 17 have the lower ends of the piston rods 63 thereof shouldered and secured to plate 16 by a nut 64 underlying the plate. The upper end of each of the valve rods 15 is threaded and projects through a hole in the valve plate 16, each rod being adjustably secured to the plate by a nut 66 beneath the plate and a nut and check nut, both designated 67, disposed above the plate. As above noted, the body 14 of the valve assembly contains a plurality of parallel vertically disposed bores, one of which is shown at 68; a movable valve element 74 secured to the lower end of the respective valve rod 15 reciprocates in each of such bores. The upper end of body 14 at the location of each bore 68 has a counterbore 69 within which is disposed an annular packing 70. A hollow threaded nut 71 is received within the threaded upper end of counterbore 69 so as firmly to thrust the packing into sealing engagement with rod 15.

Each of the bores 68 of the valve assembly forms a portion of the path of continuous circulation of its respective component. Each of the valves includes a lower inlet port 72 to which the inlet pipe 5 is connected and an upper exit port 73 to which the exit pipe 8 is connected. When the valve element 74 is lowered into the position of FIG. 5, the respective component enters its bore 68 through port 72, flows upwardly through the bore 68 around valve rod 15, and out of the bore through port 73. When the valve element is raised to open the valve as shown in FIG. 4, the discharge port of the valve, which is in immediate communication with the upper end of the mixing chamber, is opened and the portion of bore 68 above the valve element is closed, thereby shutting off the flow of the component through the upper part of bore 68 and exit port 73.

The valve element 74 is secured to the lower end of valve rod 15 so as to be maintained coaxial thereof. Valve element 74 has an upper circular cylindrical portion 75 which accurately slidably engages bore 68. Below portion 75 the valve has a frusto-conical zone 76 which converges downwardly, the lower end of portion 76 merging with the upper end of a circular cylindrical pilot pin 77 disposed coaxially of the valve element. Preferably, valve element 74 is made separate and readily disconnectable from valve rod 15. In the embodiment shown, such connection takes the form of a screw threaded central stem 78, which projects upwardly from the upper end of portion 75 of the valve element, such stem being threadedly received within a central blind passage 79 in the lower end of the valve stem 15. With such construction, the valve element may be readily removed from rod 15, and replaced by another valve element having a different diametered pin portion 77, for example, when the corresponding valve seat-forming element is changed.

The valve seat-forming element of each valve is preferably also readily removable so that, for example, it may be replaced by another valve seat having a different diametered passage therethrough. The valve seat is made up of an externally threaded annular insert member 80 which is threadedly received in a counterbore 81 at the lower end of passage 68. The upper end of member 80 has a first smaller diametered counterbore which receives therewithin the lower end portion of an annular rubber or rubber-like seat-forming member 82. The upper end 83 of member 82 is of enlarged diameter so as to project outwardly of such first counterbore into a second, upper counterbore disposed in body 14 immediately beneath bore 68. An O-ring 84 is disposed within such second counterbore and in compressed sealing relationship with the surfaces of such counterbore and the outer rim portion of the upwardly converging frusto-conical surface of portion 83 of member 82.

When the valve element 74 is raised, seat-forming member 82 relaxes so that the passage therethrough is of circular cylindrical configuration. Such passage is concentric with and of the same diameter as the passage through the lower end of member 80. Such composite passage, which is designated 85, is of such diameter as accurately and sealingly to receive the pin 77 on the lower end of the valve element. Member 82 is deformed at its upper end when the valve element 74 is lowered, as shown in FIG. 5, so as to form a seal with frusto-conical portion 76 of the valve element. When the valve element 74 is in closed position, the lower end of pin 77 extends close to the bottom of passage 85. Pin 77 acts as a plunger to thrust from passage 85 and downwardly into the mixing chamber any resin which may remain on the valve seat and the surface of passage 85.

The valve which controls the introduction of purging solvent into the mixing chamber is shown in closed position at the right in FIG. 4, and in open position in FIG. 6. Such valve includes a vertically disposed circular cylindrical bore 86 in body 14, bore 86 being coaxial of a second smaller bore 87 which slidingly receives the stem 24 of the solvent valve element. A port 88 extends radially inwardly of body 14 into communication with the upper end of bore 86, the solvent inlet pipe 10 being connected to port 88 as shown. Mounted on the lower end of valve stem 24 is a valve element 89 which has generally the same configuration as the above described valve member 74. Valve element 89 is preferably detachably mounted on the lower end of valve stem 24 by having threaded connection therewith as shown. A valve seat-forming element 90, generally similar to the above described member 80, is threadedly received in a counterbore 91 at the lower end of bore 86. A rubber or rubber-like seat-forming insert 92 fits within a counterbore in member 90, as shown. Member 92 is sealed to body 14 and member 90 by a sealing O-ring. The passage 93 through members 90 and 92 is of circular cylindrical shape when the valve is open, such passage snugly but slidingly receiving a pilot pin 94 disposed on the lower end of valve element 89 when the valve elment 89 is lowered to its closed position. When the valve is in such closed position, as shown in FIG. 4, the upper end of member 92 is deformed so as sealingly to cooperate with the frusto-conical portion of member 89. The pin 94 on valve element 89 acts, upon the closing of the valve, to remove any deposits from the wall of passage 93 and to thrust them downwardly into the mixing chamber.

Disposed within a counterbore at the upper end of body 14 is an annular packing 95 which is held compressed about rod 24 by a packing nut or gland 96. Rod 24 is vertically reciprocated, in order to open and close the solvent valve as required, by the following mechanism. A first-class lever 97 is pivoted at 98 adjacent its mid-point to a clevis fitting secured to the body 14. The radially inwardly positioned end of lever 97 is pivotally connected by a clevis joint 99 to valve rod 24. The radially outwardly located end of lever 97 is similarly pivotally connected by a clevis joint 100 to the lower end of piston rod 101 of air motor 25. When air under pressure is introduced into the upper end of air motor 25, piston rod 101 is thrust downwardly to raise valve rod 24 and thus to open the solvent valve. The solvent valve is closed by exhausting air from the upper end of motor 25 and introducing air under pressure to the lower end thereof, whereby to raise piston rod 101 and to thrust valve rod 24 downwardly. In the construction shown and described, the relationship of the parts is such that a hole 102 is provided in the component valve-actuating plate 16 so as to receive the upper end of rod 24 therein when rod 24 is raised when plate 16 is in its lowered, valve-closed position.

The air cylinders or motors 17 which control the simultaneous opening and closing of the component injecting valves, the air cylinder or motor 25 which controls the opening and closing of the solvent injecting valve, and the valve 12 which controls the introduction of compressed gas into the mixing chamber may, as above indicated, be either manually or automatically controlled. The apparatus of the invention lends itself particularly well to control by automatic means (not shown). In one such automatically controlled cycle a predetermined quantity of a mixture is formed, following which delivery of the components to the mixing chamber is stopped by closing the component injecting valves, following which solvent is introduced into the mixing chamber in a predetermined quantity or for a predetermined time. The solvent is then automatically exhausted from the mixing chamber by the introduction of compressed gas thereto by automatic mechanism controlling valve 12.

Whether the operation be manually or automatically controlled, however, so long as subsequent mixing is to be carried out after a purging has been completed, recirculation of the components supplied from the kettles or tanks 4 continues. That is, as soon as the resin injecting valves, (best shown in FIG. 5), are closed, cleaning the valve bores as they move into closed positions, each component is recirculated back to its kettle or tank 4. Continuous circulation then takes place from each kettle, through the conduits 5 leading therefrom and into the lower portion of the valve bores, such as 68, through the lower ports 72 thereof. The resin or other material then flows upwardly through the bore 68 and returns to the kettle through the upper port 73 and the return conduit 8. This continuous circulation at a uniform rate makes the resin, or other material, immediately available for discharge into the mixing chamber when the injecting valve is opened.

In addition to being immediately available the circulating resin, or other compound, is also, by the continuous circulation, maintained in the same state as the body of the material kept in the kettle. Any tendency of the small part of the material in the conduits and valve chamber changing its condition, or setting up, as due to remaining stationary, and thus possibly being subjected to different conditions from those existing in the kettle, is prevented. Instead, uniformity is maintained by the constant circulation so that the readily available material for discharge into the mixing chamber is uniform in characteristics at all times.

It will be seen from the above that the mixing apparatus in accordance with the invention discharges each component separately and apart from the others into the mixing chamber. It provides flow of the components into the mixing chamber at a balanced, predetermined flow rate which may readily be arrived at by the proper choice of the size of the component conducting passages in the replaceable valve seat-forming elements, valve elements, and/or adjustment of the variable speed drives 7 of the respective pumps 6 of the component supplies, taking into consideration the viscosity of each particular component. This permits the line pressures of the various components to be controlled as desired. The predetermined ratios of the components is held from the start of discharge of the components into the mixing chamber to the moment of shutting off of their flow into such chamber. Because of the continuous circulation of the components, when not being injected into the mixing chamber, under constant pressure in paths having portions lying close to the mixing chamber, the components are instantly available, at the predetermined desired component ratio, for immediate injection or discharge into the mixing chamber without surge. The apparatus, including the component injecting valves thereof, is of such construction that it positively stops the discharge of the components into the mixing chamber without after-drip. The component-injecting valve seats in the valve passages are positively cleaned by the valve element as the valves are closed. The mixing chamber is easily and quickly purged by means which introduces solvent into the mixing chamber and subsequently blows the solvent out of the mixing chamber and volatilizes the residual solvent. The mixing apparatus is small in size and simple in operation.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. Apparatus for mixing a plurality of fluid components to form a quickly reactive mixture, comprising a mixing chamber, means including separate conduits selectively continuously to circulate each of the components in separate closed paths, each of said conduits including a portion lying closely adjacent to the mixing chamber, short straight branch conduits extending from said portions of the respective conduits to the mixing chamber, means simultaneously to divert said components from said closed paths so as to flow through the branch conduits into the mixing chamber from said portions of the path of circulation of the components closely adjacent to the mixing chamber, said last named means comprising a valve in each of the conduits disposed immediately adjacent the mixing chamber, each valve having a valve element movable in the conduit and axially of the respective branch conduit between a valve closed, component circulating position, and a valve open, component diverting position, and means on the valve element which extends into and closes off the branch conduit close to the mixing chamber when the valve is in closed position, said last named means comprising an axially extending pin portion on the valve element which snugly fits within the respective branch conduit with the forward end of the pin portion close to the mixing chamber when the valve element is in closed position, whereby to clear the branch conduit of the fluid component carried thereby upon closing of the valve.

2. Apparatus as defined in claim 1, comprising means to clean the mixing chamber and the portions of the branch conduits immediately adjacent thereto to purge the chamber and said inner ends of the branch conduits of the components and their mixture, said means comprising means operable when said valves are closed selectively to introduce a solvent fluid into the mixing chamber.

3. Apparatus as defined in claim 2 comprising means to pass a current of rapidly flowing gas through the mixing chamber following the introduction of said solvent fluid thereinto.

4. Apparatus as defined in claim 1, wherein the valves are similar, each of the valves having a body with a bore, an end portion of the said bore forming a part of the respective branch conduit, a discharge port at the end of the bore, the valve element of the valve being reciprocable longitudinally in the bore between a closed first terminal position in which it closes the discharge port and a second, valve open, terminal position in which it lies spaced from the discharge port to open the port, an entry port communicating with the bore at a location close to the discharge port and between the terminal positions of the valve element, an exit port for permitting escape of the component from the bore into its path of recirculation, said exit port being located beyond the second terminal position of the valve element and further from the discharge port than the entry port, and an annular means on the valve element sealingly fitting within the bore and reciprocable with the valve element, said annular means being disposed between the entry port and the branch conduit when the valve is closed and being disposed between the entry and exit port of the valve to disconnect them when the valve is open.

5. Apparatus for mixing a plurality of fluid components to form a quickly reactive mixture, which comprises a valve assembly having a body, a plurality of generally similar component injecting valves comprising vertical bores disposed in spaced generally arcuate relationship in the body, a discharge port at the bottom end of each of the bores, a valve element reciprocable vertically in each of the bores between a lower terminal position in which it closes its valve port and an upper terminal position spaced from the valve port in which the port is open, an entry port communicating with each of the bores at a location close to the discharge port and between the terminal positions of the valve element, an exit port for permitting escape of the component from the bore into a closed path of recirculation, said exit port being located between the terminal positions of the valve element and further from the discharge port than the entry port, means for reciprocating the valve element, means for supplying under pressure to the entry ports of the valves fluid components to be mixed, a mixing chamber disposed below and adjacent to the discharge ports of the valves, and a discharge orifice adjacent the lower end of the mixing chamber.

6. Apparatus as defined in claim 5, comprising means detachably mounted in the valve assembly body forming the discharge ports of said valves, said valve seat-forming means being removable from below the valve assembly body, and means detachably securing the mixing chamber to the valve assembly body to permit access to the valve seat-forming means for replacement thereof, means to clean the mixing chamber to purge it to the components and their mixture, said cleaning means comprising a further valve including a further vertical bore in the valve assembly body disposed spaced from the bores of the component injecting valves, a discharge port at the bottom end of the further bore, a further valve element reciprocable vertically in said further bore between a lower terminal position in which it closes the discharge port of the further bore and an upper terminal position spaced from such discharge port in which the port is open, an entry port communicating with the further bore, means for reciprocating the valve element, and means for supplying solvent under pressure to the entry port of the further valve.

7. Apparatus as defined in claim 5, comprising an annular means on the valve element sealingly fitting within the bore and reciprocable with the valve element, said annular means being disposed between the entry port and the discharged port when the valve is closed and being disposed between the entry and exit ports of the valve to disconnect them when the valve is open.

8. Apparatus as defined in claim 7, comprising a short vertical conduit interposed between and connecting the discharge port and the mixing chamber, and lower cylindrical pin portion which accurately fits within the short conduit and extends close to the mixing chamber when the valve element is in its lower, closed terminal position.

References Cited by the Examiner
UNITED STATES PATENTS

| | | | |
|---|---|---|---|
| 956,704 | 5/10 | Hepler | 251—333 X |
| 1,613,293 | 1/27 | Reif | 251—210 |
| 2,078,983 | 5/37 | Thiberge | 259—8 X |
| 2,900,176 | 8/59 | Krogel | 259—4 X |
| 3,051,455 | 8/62 | Magester | 259—8 |
| 3,067,987 | 12/62 | Ballou | 259—7 |
| 3,129,926 | 4/64 | Hodges | 259—4 |

CHARLES A. WILLMUTH, *Primary Examiner.*

G. J. NORTH, *Examiner.*